US008779027B2

(12) United States Patent
Idemura et al.

(10) Patent No.: US 8,779,027 B2
(45) Date of Patent: Jul. 15, 2014

(54) AQUEOUS PIGMENT DISPERSION LIQUID AND INK-JET RECORDING INK

(75) Inventors: Satoshi Idemura, Saitama (JP); Kenji Sugo, Kitaadachi-gun (JP); Tomoyuki Uezono, Ageo (JP)

(73) Assignee: DIC Corporation, Tokyo (JP)

( * ) Notice: Subject to any disclaimer, the term of this patent is extended or adjusted under 35 U.S.C. 154(b) by 1107 days.

(21) Appl. No.: 12/091,544

(22) PCT Filed: Oct. 31, 2006

(86) PCT No.: PCT/JP2006/321727
§ 371 (c)(1),
(2), (4) Date: Feb. 20, 2009

(87) PCT Pub. No.: WO2007/052644
PCT Pub. Date: May 10, 2007

(65) Prior Publication Data
US 2009/0221733 A1    Sep. 3, 2009

(30) Foreign Application Priority Data

Oct. 31, 2005   (JP) ................................. 2005-316166

(51) Int. Cl.
*C09D 11/00*   (2014.01)

(52) U.S. Cl.
USPC ....... 523/160; 523/161; 106/31.6; 106/31.27; 106/499

(58) Field of Classification Search
USPC .............. 523/160, 161; 106/31.6, 31.27, 499
See application file for complete search history.

(56) References Cited

U.S. PATENT DOCUMENTS

| 2004/0068030 A1 | 4/2004 | Aida |
| 2004/0187735 A1* | 9/2004 | Taguchi et al. ............ 106/31.27 |
| 2004/0266909 A1 | 12/2004 | Segawa |
| 2005/0124726 A1* | 6/2005 | Yatake et al. ................ 523/160 |
| 2005/0143487 A1 | 6/2005 | Lou et al. |

FOREIGN PATENT DOCUMENTS

| CA | 2535487 A1 * | 2/2005 |
| EP | 1323788 A1 | 7/2003 |
| EP | 1 672 039 A1 | 6/2006 |
| GB | 2370580 A | 7/2002 |
| JP | 2000-319571 A | 11/2000 |
| JP | 2004-091520 A | 3/2004 |
| JP | 2004-143316 A | 5/2004 |
| JP | 2004-217765 A | 8/2004 |
| JP | 2005-48012 A | 2/2005 |
| JP | 2005-048014 A | 2/2005 |
| WO | 2005-014733 A1 | 2/2005 |

OTHER PUBLICATIONS

International Search Report of PCT/JP2006/321727, date of mailing Dec. 12, 2006.
Database WPI Week 200445 Thomson Scientific, London, GB AN 2004-471018, XP002591640, Dated Jul. 15, 2010.
Supplementary European Search Report dated Jul. 22, 2010, issued in corresponding European Application No. 06822656.2.
Chinese Office Action dated Feb. 16, 2011, issued in corresponding Chinese Patent Application No. 200680040290.6.

\* cited by examiner

*Primary Examiner* — Gwendolyn Blackwell
*Assistant Examiner* — Ruiyun Zhang
(74) *Attorney, Agent, or Firm* — Westerman, Hattori, Daniels & Adrian, LLP

(57) ABSTRACT

A production method of an aqueous pigment dispersion liquid of the present invention includes: a kneading step of kneading a mixture including (a) C. I. pigment violet 23, (b) a styrene-acrylic acid-based copolymer with an acid value of 50 to 300 mgKOH/g, (c) an alkali metal hydroxide, (d) water, and (e) a wetting agent, thereby producing a colored, kneaded material; and a dispersion step of dispersing the pigmented, kneaded material in an aqueous medium by using a dispersing machine with media, wherein the mass ratio of (b)/(a) in the kneading step is within a range of 0.15 to 0.45, the mass ratio of (d)/(a) in the first half of the kneading step is within a range of 0.04 to 0.42, and the change in viscosity of materials to be dispersed in the dispersion step is 10% or lower.

7 Claims, No Drawings

AQUEOUS PIGMENT DISPERSION LIQUID AND INK-JET RECORDING INK

TECHNICAL FIELD

The present invention relates to a production method of an aqueous pigment dispersion liquid using a violet pigment, and to an ink-jet recording ink including, as a main component, the aqueous pigment dispersion liquid produced by the production method of the aqueous pigment dispersion liquid.

BACKGROUND ART

Aqueous inks have become the major ink for ink-jet recording use other than an industrial use because the danger of fire and toxicity such as mutagenicity, which are peculiar to oil-based inks, can be reduced. In aqueous inks, dyes have been used as coloring agents because stability is high, nozzle clogging is reduced, color-developing properties is favorable, and printing with high image quality is possible. However, dyes have the problems of poor water resistance and light fastness. In particular, with an increase of the case where a printed matter is used outdoors for industrial use or indoors for long-term ornamental purposes, excellent water resistance and light fastness are required for pictures formed of an ink-jet recording ink.

In order to solve this problem, the conversion from dyes to pigments has been actively performed. However, in pigment inks, nozzle clogging is likely to occur due to the aggregation/sedimentation of pigments although excellent water resistance and light fastness can be expected. Therefore, the method has been investigated, which disperses pigments in an aqueous medium by using polymer-based dispersing agents so as to obtain favorable dispersion stability and favorable discharging properties during ink-jet recording.

In particular, in recent years, investigations have been performed, which use inks having a color tone such as red or violet in addition to the 4 colored inks of black, cyan, magenta, and yellow, thereby increasing the color zone of a printed image and obtaining a favorable color reproduction. Therefore, regarding a color tone other than the conventional basic 4 colors, which is called a special color, an attempt is performed, which uses pigments so as to improve the water resistance and light fastness of pictures formed of an ink-jet recording ink.

Violet is one of the color tones used as such special colors. Also, C.I. pigment violet 23 is a violet pigment which is excellent in color-developing properties and light fastness, and there are the reports of ink-jet recording inks which uses C.I. pigment violet 23 (see patent references 1 and 2).

In the case where the aforementioned pigment is used in an ink-jet ink, importance is attached to high stability which is enough to maintain an average particle diameter and the viscosity of pigment particles dispersed in the liquid of an ink for a long time particularly even under high-temperature conditions of 50° C. or more. In particular, in the case where ink-jet recording is performed by using an ink-jet printer of a thermal jet recording system, the aforementioned high-temperature preservation stability is essential. However, in C.I. pigment violet 23, an anionic group-containing resin, which is favorably used as a dispersing resin, for example a styrene-acrylic acid-based resin, is easily eliminated from the pigment surface in comparison with other pigments. In an ink-jet recording ink produced by the methods described in the aforementioned patent references 1 and 2, sufficient stability cannot always be obtained.

In the methods described in the patent reference 1, C.I. pigment violet 23 is dispersed by using a styrene-(meth) acrylic acid-based water-soluble resin as a dispersing agent. Dispersion is performed by using a sand mill, but there is no kneading step followed by the dispersion. Therefore, resin-coating of the pigment surface of C.I. pigment violet 23, from which resins are easily eliminated primarily, is not rigidly performed, and the resins are easily eliminated. Thus, sufficient dispersion-stability cannot be ensured.

Also, the patent reference 2 discloses a production method of an aqueous pigment dispersion liquid which uses a kneading step, and an apparatus and a dispersion liquid which are suitable for this production method. In addition, C.I. pigment violet 23 is also exemplified as a usable pigment, and a styrene-acrylic acid-based resin is used as a resin. However, no example is disclosed on the production of an aqueous pigment dispersion liquid using C.I. pigment violet 23. Even though a styrene-acrylic acid-based resin is extremely easily eliminated from the pigment surface of C.I. pigment violet 23 in comparison with other pigments, the specific investigation, in which this particularity is considered, is not performed. Accordingly, regarding a production method of an aqueous pigment dispersion liquid, particularly a kneading step, the selection of raw materials, the optimization of composition, and the investigation of step conditions are not performed. Therefore, the disclosed production method is not sufficient for sufficiently fulfilling long-term preservation stability at a high temperature.

In this way, even though C.I. pigment violet 23 has a favorable light fastness, in the conventional production method, a resin was not able to rigidly attach to the pigment surface of C.I. pigment violet 23, and it was impossible to form an ink-jet recording ink having favorable dispersion stability. Therefore, aggregation frequently occurs during stable long-term preservation at high temperatures, and sufficient discharging stability, preservation stability, and a luster were not able to be obtained particularly when an ink was used for printing and image formation using thermal jet recording.

[Patent Reference 1] Japanese Unexamined Patent Application, First Publication No. 2004-217765
[Patent Reference 2] Japanese Unexamined Patent Application, First Publication No. 2004-143316

DISCLOSURE OF INVENTION

An object of the present invention is to provide a production method of an aqueous pigment dispersion liquid having a purple color, which is excellent in water resistance, light fastness, and color-developing properties, and which simultaneously exhibits long-term stability at high temperatures and a high luster. Objects of the present invention are also to provide an ink-jet recording ink, particularly an ink-jet recording ink which is suitable for an ink-jet recording printer using a thermal jet print system, and a production method of an aqueous pigment dispersion liquid that can be used for the production of the ink.

The present inventors have f performed their investigation in full consideration of the aforementioned background, and then found the following and completed the present invention. In the case where C.I. pigment violet 23, a styrene-acrylic acid-based copolymer, an alkali metal hydroxide, water, and a wetting agent are used, these constituent materials are mixed at the ratios within specific ranges, and then are subjected to kneading and dispersion steps under specific conditions, it is possible to produce an aqueous pigment dispersion liquid having favorable dispersion stability even when C.I. pigment violet 23, in which styrene-acrylic acid-based copolymers are easily eliminated from the pigment surface, is used.

In other words, the present invention provides a production method of an aqueous pigment dispersion liquid including: a kneading step of kneading a mixture including C. I. pigment violet 23 (a), a styrene-acrylic acid-based copolymer (b) with an acid value of 50 to 300 mgKOH/g, an alkali metal hydroxide (c), water (d), and a wetting agent (e), thereby producing a colored, kneaded material; and a dispersion step of dispersing the colored, kneaded material in an aqueous medium by using a dispersing machine with media, wherein the mass ratio of (b)/(a) is within a range of 0.15 to 0.45 in the kneading step, the mass ratio of (d)/(a) is within a range of 0.04 to 0.42 in the first half of the kneading step, and the change in viscosity of materials to be dispersed is 10% or lower in the dispersion step.

In addition, the present invention provides an ink-jet recording ink including, as a main component, the aqueous pigment dispersion liquid produced by the aforementioned production method of the aqueous pigment dispersion liquid.

In the present invention, the words "the first half of the kneading step" mean the time from a point in time when the kneading step is started to a point in time when half of the entire kneading time has elapsed.

According to the present invention, because C. I. pigment violet 23, which is excellent in light fastness and color-developing properties, is used as a pigment and each of pigment particles is favorably coated with resins, it is possible to produce an aqueous pigment dispersion liquid having a purple color, which is excellent in water resistance, light fastness, and color-developing properties, and which simultaneously exhibits long-term stability at high temperatures and a high luster. Also, by using this aqueous pigment dispersion liquid, it is possible to produce an ink-jet recording ink, particularly an ink-jet recording ink which is suitable for an ink-jet recording printer using a thermal jet print system.

BEST MODE FOR CARRYING OUT THE INVENTION

A production method of an aqueous pigment dispersion liquid of the present invention includes, at first, a kneading step of kneading a mixture including C. I. pigment violet 23 (a), a styrene-acrylic acid-based copolymer (b) with an acid value of 50 to 300 mgKOH/g, an alkali metal hydroxide (c), water (d), and a wetting agent (e). In addition, the kneading conditions are optimally adjusted for C. I. pigment violet 23 such that the mass ratio of (b)/(a) is within a range of 0.15 to 0.45 and the mass ratio of (d)/(a) is within a range of 0.04 to 0.42 in the first half of the kneading step. Thereby, the crushing of the pigment and the coating of the crushed pigment surface with styrene-acrylic acid-based copolymers proceed simultaneously and extremely efficiently, and a colored, kneaded material, in which the resin is rigidly adsorbed to the pigment surface, is formed. Because the ratio of resin/pigment is appropriately adjusted in the present invention, the coloring power of C. I. pigment violet 23 is favorably maintained, and the pigment surface is sufficiently coated with the resins. Also, the preservation stability of an aqueous pigment dispersion liquid is not deteriorated due to the surplus resins exceeding the adsorption power of the pigment in an aqueous medium. Furthermore, in the present invention, the ratio of water/pigment in the kneading step is defined so as to reduce the addition amount of water other than the water which is required to form an aqueous solution of an alkali metal hydroxide, and the viscosity adjustment of the kneaded material is mainly performed with a wetting agent. As a result, a strong shearing force can be generated, and rigid adsorption of a styrene-acrylic acid-based copolymer to the pigment surface can be achieved.

Therefore, the colored, kneaded material can be dispersed in an aqueous medium by a dispersing machine with media, and can be converted into an aqueous pigment dispersion liquid containing the pigment particles each of which are coated with the resins.

Furthermore, in a production method of an aqueous pigment dispersion liquid of the present invention, the change in viscosity of the materials to be dispersed is 10% or lower in the dispersion step. When the dispersion step is performed under the condition of the small change in viscosity, a styrene-acrylic acid-based copolymer, which has adsorbed to the surface of C. I. pigment violet 23 in the kneading step, is never eliminated again from the pigment surface, and is never dissolved or dispersed in an aqueous medium as a resin which does not accompany the pigment. Accordingly, these resins never cause the aggregation of pigments, and never deteriorate dispersion stability. Also, these resins never adsorb to the inner wall of a nozzle, and never become the cause of ink-discharging failure.

As the reasons why suppressing the change in viscosity to 10% or lower in the dispersion step is important, as described previously, there are the facts that styrene-acrylic acid-based copolymers are easily eliminated from the surface of C. I. pigment violet 23 and that the stably adsorbed amount is not enough. Therefore, although the kneading step is performed while the blending amount of the resins is extremely reduced from the beginning, when the elimination of the copolymer in the dispersion step proceeds so as to generate the change in viscosity of materials to be dispersed of more than 10%, it is considered that the amount of resins remaining on the surface of C. I. pigment violet 23, which was originally in a small amount, is reduced and that the surface cannot be coated stably.

Also, the use of the production method including the aforementioned kneading and dispersing steps produces an extremely significant effect particularly on the high-temperature preservation stability of C. I. pigment violet 23.

Therefore, an ink-jet recording ink prepared from the aqueous pigment dispersion liquid produced by the aforementioned production method is favorably used for an ink-jet recording printer using a thermal jet print system.

In a production method of the present invention, it is preferable that the mass ratio of water (d)/C. I. pigment violet 23 (a) be within a range of 0.04 to 0.42 in not only the first half but also the whole of the kneading step since a prepared ink-jet recording ink has much favorable high-temperature preservation stability.

In a production method of an aqueous pigment dispersion liquid of the present invention, the mass ratio of the styrene-acrylic acid-based copolymer (b)/C. I. pigment violet 23 (a) and the mass ratio of water (d)/C. I. pigment violet 23 (a) are defined within the specified ranges. In addition, it is preferable that the mass ratio of the wetting agent (e)/C. I. pigment violet 23 (a) be defined within a range of 0.15 to 0.60 since high-temperature preservation stability of the ink-jet recording ink produced from the aqueous pigment dispersion liquid is further improved.

In a production method of an aqueous pigment dispersion liquid of the present invention, it is preferable that the styrene-acrylic acid-based copolymer (b) has a styrene-based monomer unit of 60 mass % or more in the total amount of all the monomer units and a weight average molecular weight of 6000 to 40000 because the dispersion property of the aqueous pigment dispersion liquid, and the dispersion stability property and the discharging property of the ink-jet recording ink produced from the aqueous pigment dispersion liquid are improved.

Also, in the dispersion step following the kneading step, it is preferable that the number of coarse particles with a particle diameter of 1 μm or more be 15 million to 1 billion pieces/mL after the dispersion step because high-temperature preservation stability of the ink-jet recording ink produced from the aqueous pigment dispersion liquid is further improved.

A production method of an aqueous pigment dispersion liquid of the present invention includes the kneading step preparing a colored, kneaded material in the form of a solid and the following dispersion step using a media dispersing machine, and preferably includes a centrifugal separation step. In the kneading step, the surfaces of pigment particles in an aggregation state are coated with styrene-acrylic acid-based copolymers, and the crushing of the aggregate proceeds. In the dispersion step, pigments are further completely dispersed so as to produce fine dispersed pigment particles. In the centrifugal separation step, the coarse particle components which cannot be sufficiently dispersed in the dispersion step are removed so that the average dispersion particle diameter thereof can be further decreased.

Also, by performing the centrifugal separation after the dispersion step, it is possible to produce an aqueous pigment dispersion liquid which is used to prepare an ink-jet recording ink excellent in water resistance, light fastness, color-developing properties, a luster, long-term preservation stability at a high temperature, and a discharging property. Hereinafter, the content of each step is described.

1. Kneading Step

In the kneading step, kneading is performed while a shearing force is given to the mixture including the clayey mixture formed by C. I. pigment violet 23 (a), a styrene-acrylic acid-based copolymer (b), an alkali metal hydroxide (c), water (d), and wetting agent (e) as main components. In order to apply a strong shearing force for both favorably performing the crushing of the pigment and the resin-coating of the pigment surface, it is natural that the solid content ratio of the mixture needs to be appropriately adjusted according to the type of a pigment. Furthermore, in the present invention, the mass ratio of the styrene-acrylic acid-based copolymer (b)/C. I. pigment violet 23 (a) and the mass ratio of water (d)/C. I. pigment violet 23 (a) are defined within the specified ranges. In particular, in the case where C. I. pigment violet 23 is used as a pigment, the ratio of a pigment and water needs to be defined within the specified range so as to rigidly attach the styrene-acrylic acid-based copolymer to the pigment surface. More preferably, the ratio of the pigment and the wetting agent is defined within the specified range. Furthermore, in order that both the crushing of the pigment and the resin-coating of the pigment surface favorably proceed by a strong sheering force provided by a kneading machine, it is important to define the ratio of the styrene-based monomer unit in the styrene-acrylic acid-based copolymer and the weight average molecular weight within the specified range.

By performing the kneading step with the aforementioned conditions, the crushing proceeds favorably, and the microparticulation proceeds. Also, the styrene-acrylic acid-based copolymer is rigidly adsorbed to the pigment surface in the kneading step. Then, the resins which coat the pigment surface are rarely eliminated from the pigment surface in the step of dispersing the colored, kneaded and solid material in an aqueous medium. Therefore, even in the process of dispersing the solid, kneaded material, the coating condition of each pigment composing the colored, kneaded and solid material is maintained.

In the kneading step of a production method of the present invention, the mass ratio of the styrene-acrylic acid-based copolymer (b)/C. I. pigment violet 23 (a) is within a range of 0.15 to 0.45 as described above. When the ratio is lower than the lower limit of this range, the resin content is insufficient so the coating of the pigment is likely to be insufficient and the aggregation among the pigments is likely to occur. Also, the problem tends to occur, in which a luster is not enough when an ink-jet recording composition is formed and a printed matter is produced. Also, when the ratio is higher than the upper limit of this range, the problems tend to occur, in which color-developing is insufficient, and the dispersion stability is deteriorated. The amount of the resin is preferably kept to a minimum for coating pigments, and the percentage of the resins that remain in an aqueous pigment dispersion liquid without attaching to the pigment surface is preferably lowered as much as possible, and the value of (b)/(a) is preferably 0.15 to 0.35. In particular, the value of (b)/(a) is very important for favorably maintaining high-temperature preservation stability in consideration of the use as an ink-jet recording ink using a thermal jet print system.

The alkali metal hydroxide (c) is preferably used in such a way that a neutralization percentage is within a range of 80 to 120%. In this case, when the addition of the alkali metal hydroxide (c) and water (d) to the mixture of the kneading step is performed by adding the aqueous solution produced by preliminarily diluting an alkali with water homogeneously, workability is extremely good.

The amount of water (d) is adjusted such that the mass ratio of (d)/(a) is within a range of 0.04 to 0.42 in the first half of the kneading step, and the kneading is preferably performed within a range of 0.05 to 0.30, and more preferably within a range of 0.05 to 0.20. When the mass ratio is lower than 0.04, an alkali is not sufficiently dissolved, and the resins remain in a solid form without being neutralized and do not interact with the pigment. Also, when the mass ratio is higher than 0.42, a decrease in the viscosity of the kneaded material occurs, and a sufficient shearing force is not applied to the kneaded material in the kneading step. Also, the styrene-acrylic acid-based copolymer is likely to be removed into water, and tends not to be efficiently adsorbed to the surface of C. I. pigment violet 23. In particular, when the blending amount of the copolymer is reduced from the beginning of the kneading, the addition amount of water has a significant effect.

Therefore, it is preferable to reduce the addition amount of water other than the amount required to form the aqueous solution of an alkali metal hydroxide, and the viscosity adjustment of the kneaded material is preferably performed mainly by using the wetting agent (e).

In the present invention, the words "the first half of the kneading step" mean the time till a point in time when half of the entire kneading time has elapsed, and the adjustment of (d)/(a) during this time is important. It is preferable that (d)/(a) be maintained within the aforementioned range for 2 hours after the start of the kneading, and it is more preferable that (d)/(a) be maintained within a range of 0.06 to 0.15 for 1 hour after the start of the kneading. When an aqueous pigment dispersion liquid is produced, in the kneading step, promoting the kneading by gradually adding water is usually performed in the last half of the kneading step, and the addition amount of water is not specifically defined. However, in the case where a pigment is C. I. pigment violet 23, it is preferable to reduce the addition amount of water so that the mass ratio is within the aforementioned range of 0.04 to 0.42 during the entire kneading step because the resins are rigidly adsorbed to the pigment surface. By doing so, the coating of the pigment with resins which are useful for securing stability, i.e. the styrene-acrylic acid-based copolymer sufficiently proceeds, and the resins are rigidly adsorbed to the pigment surface of C. I. pigment violet.

The amount of the wetting agent (e) is preferably adjusted so that the mass ratio of the wetting agent (e)/C. I. pigment violet 23 (a) is within a range of 0.15 to 0.6. When the ratio is lower than the lower limit of this range, the interaction between the pigment and the resin is not sufficient, and so the crushing of the pigment cake and the coating of the pigment surface tend to be difficult to proceed. Also, when the ratio is higher than the upper limit of this range, the viscosity of the kneaded material is decreased, and a sufficient shearing force is not given to the pigment, and so crushing of the pigment tends to be difficult to proceed.

As an apparatus used for the kneading step, a known kneading device with a roll or a stirring blade can be used. Among them, a press kneader, a henschel mixer, and a planetary mixer, which have a stirring tank and a stirring blade, are preferable, and moreover, a kneading apparatus, in which a stirring blade can rotate and revolve, is preferable. Representative examples thereof include a press kneader and a planetary mixer, and the latter is particularly preferable in that the applicable viscosity region is broad and that the kneading temperature can be decreased to a low temperature.

In order to sufficiently obtain the effect of kneading by a planetary mixer, the following conditions are required in the case where a planetary mixer has a volume of 20 to 100 L: a rotation frequency of 20 to 40 rpm, a revolution frequency of 7 to 30 rpm, and a kneading time of 300 min or more, and preferably 340 min or more. In the case where a planetary mixer has a volume of 50 L, a rotation frequency of 30 to 40 rpm and a revolution frequency of 20 to 30 rpm are preferable. Depending on the size of a planetary mixer, an optimal range of a frequency can be appropriately set within the aforementioned range as long as a circumferential velocity is almost the same. Also, a range of 70 to 120° C., preferably a range of 80 to 105° C. can be exemplified as a temperature condition. When the kneading is performed at a lower temperature than the temperature range, the interaction of the resin and the pigment is likely to be insufficient. When the kneading is performed at a higher temperature than the temperature range, the decomposition of a resin is likely to be caused by heat.

Subsequently, as a dilution operation which is a post treatment after kneading, water is preferably added to the obtained kneaded material at a slow rate so as to adjust the pigment content to a range of 10 to 40 mass % depending on an appropriate viscosity for a dispersing machine used in the dispersion step, and particularly, a range of 20 to 30 mass % is more preferable. The addition rate of water during dilution is usually within a range of 0.005/min to 0.2/min as an increasing rate of the mass ratio of water/pigment. In contrast, the rate of adding water in the kneading step is 0.002/min or less as an increasing rate of the mass ratio of water/pigment, and is preferably much lower than during dilution (let-down) operation.

During the dilution operation, according to need, an organic solvent, a preservative agent, a foam inhibitor, and an antifoaming agent can be added together. This dilution operation may just be performed in the mixing tank of the apparatus used for kneading, or may be performed after transferring to another vessel. In addition, it is possible to appropriately combine both of them. Also, in order for the dilution operation to smoothly proceed, the solid content of the colored, kneaded material is preferably within a range of 50 to 80 mass %. When the solid content exceeds 80 mass %, a long time tends to be required for the dilution operation after kneading. When the solid content is lower than 50 mass %, a strong shearing force tends to hardly occur during kneading. It is preferable to switch over from the kneading step to the dispersing step after viscosity is adjusted by the dilution step to 15 mPa·s or less.

2. Dispersing Step

The mixture obtained in this way is dispersed in an aqueous medium by using a dispersing machine with media, thereby promoting the dispersion of the pigment, C. I. pigment violet 23. The point in this step is that excessive dispersion decreases favorable interaction between the resins and the pigment so that the resins, which coat the pigment surface by strong interaction, are eliminated from the pigment surface. The pigment surface, from which the resins are eliminated, is likely to form an aggregate with other pigments and to cause an aggregation with the passage of time, thereby having an adverse effect on dispersion stability. In particular, the resins are easily eliminated from the pigment surface of C. I. pigment violet 23, and the aggregation among the pigments is likely to proceed at a high temperature region.

In order to prevent these, in the kneading step, the styrene-acrylic acid-based copolymer is adsorbed to the pigment as rigidly as possible, and after achieving a stable coating condition, this pigment is preferably dispersed in an aqueous medium in such a mild dispersing step that the coating condition is not destroyed.

In order to achieve this dispersion condition, it is necessary that dispersion needs to be performed such that the change in viscosity is basically 10% or lower in the dispersion step. When there is no change in viscosity in the dispersing step, the following are believed: although the microparticulation of dispersed particles proceeds, the resins are rarely eliminated from the pigment surface, and there is no change in the amount of the resins which are present in the dispersion liquid and adsorb to the pigments. For example, it is preferable to set dispersion conditions so that the solid colored, kneaded material composed of the pigments, which are microparticulated and coated with the resins by the sufficient crushing process of the kneading step, are just untangled to each of the constituent pigment particles in the dispersing step. Even if coarse particles remain in the aqueous dispersion liquid after the end of the dispersing step, they can be removed in the centrifugal separation step. Meanwhile, for microparticles from which resins have been eliminated, aggregation is likely to occur, and the preservation stability of the aqueous dispersion liquid is deteriorated. When such pigment particles are produced once, they can no longer be removed in the centrifugal separation step. Although firstly dispersed, such pigment particles aggregate as time goes on, and deteriorate the preservation stability of the aqueous pigment dispersion liquid. In particular, because the aggregation is accelerated during high temperature preservation, it is impossible to be used in an ink-jet recording printer using a thermal jet print system.

For these reasons, in the dispersing step, particles with a particle diameter of 1 mm or more (hereinafter, described as coarse particles) are preferably contained within a range of 150 million to 1 billion pieces/mL, and more preferably within a range of 250 million to 1 billion pieces/mL. When the dispersing step is performed under the condition in which the strong shearing force is set or the dispersing time is set so long that the number of coarse particles is less than the lower limit of the aforementioned range, aggregation due to the elimination of the aforementioned resins is likely to occur. On the other hand, when there are coarse particles exceeding the upper limit of the aforementioned range, there are too many coarse particles, and the discharging property and a luster tend to be deteriorated. However, from the viewpoint of securing the dispersion stability, it is rather unpreferable to strongly crush coarse particles so as to extremely reduce the number of coarse particles. It is preferable that, in the dispersing step, the microparticulation of the pigments due to crushing is performed as rarely as possible so as to just untangle the solid kneaded material, and that the remaining coarse particles are removed in the centrifugal separation step.

The viscosity of the dispersion liquid in the dispersing step is increased when the resin, which is eliminated from the pigment surface by the extreme dispersion, is dissolved in the liquid phase. Therefore, it is necessary that the change in viscosity (increase in viscosity) is controlled to 10% or lower in the dispersing step. While viscosity is dependent on the pigment content, the viscosity after the dispersing step is preferably 5.0 mPa·s or lower in the case where the pigment content is 10 mass %, and more preferably 5.0 mPa·s or lower in the case where the pigment content is 20 mass %. By using the number of coarse particles and the viscosity of the dispersion liquid after the dispersing step, it is possible to estimate the stability of the dispersion liquid when an ink-jet recording ink is finally prepared.

This dispersion is usually performed at a temperature range of 0 to 50° C., but the temperature is not particularly limited. Specifically, in the case where the continuation type beads mill is used and where the dispersion is performed with a packing ratio of about 80 vol % for a retaining period of 1 to 5 min, and preferably 2 to 4 min, it is easy to obtain a coarse particle content within the aforementioned range.

Examples of a dispersing machine with media which is used in the dispersion step include a sand mill, a paint shaker, a ball mill, a sand grinder, DYNO-MILL, DISPERMAT, a SC mill, a spike mill, an agitator mill, and a pin mill.

The increase in viscosity in the dispersion step can occur due to the evaporation of a solvent. However, usually in a dispersing machine with media, the dispersion region, where media, i.e. dispersing media, and materials to be dispersed coexist, has a quasi-sealed structure other than a supply port and a discharge port. Therefore, it can be believed that there is little evaporation of the solvent. Therefore, it is basically unnecessary to consider the increase in viscosity due to the evaporation of the solvent.

In the present invention, media means a material such as beads, which coexists with materials to be dispersed in a dispersing machine and crushes them, and may be called dispersing media.

3. Centrifugal Separation

By performing centrifugal separation after the aforementioned step, the remaining coarse particles can be reduced, and it is possible to obtain an aqueous pigment dispersion liquid which can produce an ink with excellent dispersing properties. It is preferable that the content of coarse particles with a particle diameter of 1 µm or more be adjusted to 10 million pieces/mL or lower in the aqueous pigment dispersion liquid after the centrifugal separation step. The centrifugal separation operation may be performed in a conventional centrifugal separation apparatus, and can be performed by appropriately setting optimal conditions within the conditions of a centrifugal force of 5000 to 30000 G, a temperature of 10 to 70° C., and a time period of 2 to 10 min. Also, the centrifugal separation operation may be performed repeatedly. Also, a filtration step can be used after the centrifugal separation step. The pigment content in the obtained aqueous pigment dispersion liquid after the centrifugal separation step is preferably 10 to 20 mass %.

Even if coarse particles remain in an aqueous pigment dispersion liquid after the dispersion step, not using such strong dispersion condition that may cause elimination of the resin adsorbed to the pigment, they can be efficiently removed using the centrifugal separation step.

The aqueous pigment dispersion liquid, which is obtained in the aforementioned way, usually includes finely dispersed pigment particles with an average particle diameter of about 100 nm, and an ink-jet recording ink can be prepared using this aqueous pigment dispersion liquid by a conventional method.

Hereinafter, each raw material used in the production process of the aforementioned aqueous pigment dispersion liquid is described.

C. I. pigment violet 23 (a), which is a pigment used in the present invention, is excellent in color-developing properties and light fastness, and is excellent as a pigment for ink-jet which assists the basic 4 colors of black, cyan, magenta, and yellow. The particle diameter of C. I. pigment violet 23, which is an average particle diameter obtained by the observation with electron microscope, is preferably 200 nm or less, and more preferably 100 nm or less. When the particle diameter exceeds 200 nm, the discharging property of an ink containing the C. I. pigment violet 23 is deteriorated.

A styrene-acrylic acid-based copolymer (b) used in the present invention includes, as constituent monomers, a styrene-based monomer and at least one of acrylic acid and methacrylic acid, and preferably includes all of a styrene-based monomer, acrylic acid, and methacrylic acid. In the composition ratio of the constituent monomers of the styrene-acrylic acid-based copolymer, the ratio of a styrene-based monomer unit to the total amount of all the monomer units is preferably 60 mass % or more, and more preferably within a range of 60 to 90 mass %. In particular, the sum of a styrene-based monomer unit, an acrylic acid monomer unit, and a methacrylic acid monomer unit is preferably 95 mass % or more in the total amount of all the monomer units.

When the amount of the styrene-based monomer unit is lower than 60 mass %, the affinity of the styrene-acrylic acid-based copolymer (b) to C. I. pigment violet 23 (a) is likely to be insufficient, and dispersion stability tends to be deteriorated. Also, in the obtained ink-jet recording ink, recording properties to a plain paper is likely to be deteriorated, and the image-recording density tends to be lowered. Also, the water resistance is likely to be deteriorated. When the amount of a styrene-based monomer unit is higher than 90 mass %, the solubility of the styrene-acrylic acid-based copolymer (b) in an aqueous medium is deteriorated, and the dispersion property and the dispersion stability of the pigment in the aqueous pigment dispersion liquid tend to be deteriorated. Also, the printing stability tends to be deteriorated in the case where the aqueous pigment dispersion liquid is used for an ink-jet recording ink.

As a styrene-based monomer unit which constitutes the styrene-acrylic acid-based copolymer used in the present invention, a known compound can be used. Examples thereof include an alkylstyrene such as styrene, α-methylstyrene, β-methylstyrene, 2,4-dimethylstyrene, α-ethylstyrene, α-butylstyrene, or α-hexylstyrene; a halogenated styrene such as 4-chlorostyrene, 3-chlorostyrene, or 3-bromostyrene; 3-nitrostyrene; 4-methoxystyrene; and vinyltoluene.

Among these styrene-based monomers, an alkylstyrene monomer is preferably used, and a styrene monomer is most preferably used.

The acid value of the styrene-acrylic acid-based copolymer (b) used in an aqueous pigment dispersion liquid of the present invention is 50 to 300. When the acid value is lower than 50, a hydrophilic property is deteriorated, and the dispersion stability of the pigment, C.I. pigment violet 23, tends to be deteriorated. Meanwhile, when the acid value is higher than 300, coagulation of the pigments is likely to occur, and the water resistance of the printed matter produced by using the ink tends to be deteriorated. The acid value is preferably within a range of 60 to 250, and more preferably within a range of 70 to 200. Herein, an acid value is represented by the number of mg of potassium hydroxide required to neutralize an acid component included in a sample of 1 g, and the unit thereof is mgKOH/g.

It is preferable that acrylic acid and methacrylic acid be used as constituent monomers in the styrene-acrylic acid-based copolymer (b) since random copolymerization characteristics are improved at the time of a resin synthesis, and there is the effect to improve the solubility of the resins.

The styrene-acrylic acid-based copolymer (b) may contain a monomer other than a styrene-based monomer, an acrylic acid, and a methacrylic acid, which is polymerizable with these monomers. The content of this monomer is lower than 5 mass % as a component amount. Examples thereof include (meth)acrylic esters such as methyl (meth)acrylate, ethyl (meth)acrylate, n-propyl (meth)acrylate, isopropyl (meth)acrylate, n-butyl (meth)acrylate, sec-butyl (meth)acrylate, tert-butyl (meth)acrylate, 2-methylbutyl (meth)acrylate, 2-ethylbutyl (meth)acrylate, 3-methylbutyl (meth)acrylate, 1,3-dimethylbutyl (meth)acrylate, pentyl (meth)acrylate, hexyl (meth)acrylate, 2-ethylhexyl (meth)acrylate, heptyl (meth)acrylate, octyl (meth)acrylate, or nonyl (meth)acrylate; (meth)acrylic ester derivatives such as 2-ethoxyethyl acrylate, 3-ethoxypropyl acrylate, 2-ethoxybutyl acrylate, 3-ethoxybutyl acrylate, dimethylaminoethyl (meth)acrylate, hydroxyethyl (meth)acrylate, hydroxypropyl (meth)acrylate, hydroxybutyl (meth)acrylate, ethyl-α-(hydroxymethyl)acrylate, or methyl-α-(hydroxymethyl)acrylate; aryl (meth) acrylic esters and aralkyl (meth)acrylic esters such as phenyl (meth)acrylate, benzyl (meth)acrylate, or phenylethyl (meth) acrylate; polyhydric alcohol such as diethylene glycol, triethylene glycol, polyethylene glycol, glycerin, or bisphenol A; and mono(meth)acrylic esters of polyhydric phenol; and dialkyl maleic ester such as dimethyl maleate or diethyl maleate. One, or two or more of these monomers can be added as monomer units.

The styrene-acrylic acid-based copolymer (b) used in the present invention has the weight average molecular weight within a range of 6,000 to 40,000. The weight average molecular weight is preferably within a range of 7,500 to 30,000, and more preferably within a range of 7,500 to 12,000. When the weight average molecular weight is lower than 6,000, the long-term preservation stability of the dispersion liquid tends to be deteriorated although it is easy to disperse and microparticulate C. I. pigment violet 23 in the beginning. Also, sedimentation tends to occur due to the aggregation of C. I. pigment violet 23.

When the weight average molecular weight of the styrene-acrylic acid-based copolymer (b) exceeds 40,000, the viscosity of the ink-jet recording ink, which is prepared from the aqueous pigment dispersion liquid using the styrene-acrylic acid-based copolymer (b), is increased, and the discharging stability of the ink tends to be deteriorated.

The styrene-acrylic acid-based copolymer (b) used in the present invention may be any of a random copolymer, a block copolymer, and a graft copolymer. An example of a graft copolymer is a graft copolymer in which polystyrene or the copolymer of styrene and a nonionic monomer, which is copolymerizable with styrene, forms a stem or a branch and a copolymer of acrylic acid or methacrylic acid, and another monomer including styrene forms a stem or a branch. The styrene-acrylic acid-based copolymer (b) may be the mixture of the aforementioned copolymer and a random copolymer.

In an aqueous pigment dispersion liquid of the present invention, the content of the styrene-acrylic acid-based copolymer (b) per 100 parts by mass of C. I. pigment violet 23 (a) is 15 to 45 parts by mass as described previously, and preferably 20 to 40 parts by mass. When the content of the styrene-acrylic acid-based copolymer (b) is lower than 15 parts by mass, the dispersion stability of the aqueous pigment dispersion liquid is deteriorated, and rub resistance tends to be deteriorated in the case where an ink-jet recording ink is prepared by using the aqueous pigment dispersion liquid. When the content of the styrene-acrylic acid-based copolymer (b) exceeds 45 parts by mass, the viscosity of the ink-jet recording ink tends to be too high. In particular, in C. I. pigment violet 23 (a), the resins are easily eliminated from the pigment surface, and the viscosity of the ink is likely to be increased. Therefore, the content of the styrene-acrylic acid-based copolymer is preferably the minimum required to coat the pigment surface.

An alkali metal hydroxide (c) used in the present invention neutralizes a part of the acid groups of the styrene-acrylic acid-based copolymer, softens the resins in the kneading step so as to facilitate the coating process of the pigment with the resins, and improves the dispersion properties of the pigment coated with the resins. Examples of the alkali metal hydroxide include sodium hydroxide, potassium hydroxide, and lithium hydroxide, and potassium hydroxide is particularly preferable. The addition amount of the alkali metal hydroxide (c) is preferably adjusted so that the neutralization percentage is 80% to 120% on the basis of the acid value of the styrene-acrylic acid-based copolymer (b).

The neutralization percentage is preferably set to be 80% or higher in terms of the improvement of the dispersion rate in an aqueous medium, the dispersion stability, and the preservation stability. Also, the neutralization percentage is preferably set to be 120% or lower in terms of the prevention of gelation during long-term preservation and the water resistance of the printed matter produced by using the ink.

In the present invention, the neutralization percentage means the value which indicates the percentage (how many times) of the alkali metal hydroxide added in comparison with the amount required to neutralize all the carboxyl groups in the styrene-acrylic acid-based copolymer, and is calculated by the following equation.

Neutralization Percentage (%)=((Mass of basic compound (g)×56×1000)/(Acid Value of Resin× Equivalent of Basic Compound)×Amount of Resin (g)))×100

In a production method used in the present invention, it is preferable to use ion-exchanged water or water in which the amount of impurities has been reduced to the same level as in ion-exchanged water.

The content of water (d) in an aqueous pigment dispersion liquid of the present invention is preferably 3 to 50 mass %, and more preferably 5 to 40 mass %. When the content is lower than the lower limit, the dry-prevention effect tends to be insufficient. When the content exceeds the upper limit, the dispersion stability of the dispersion liquid tends to be deteriorated.

As a wetting agent (e) used in the present invention, known conventional wetting agents can be used, and examples thereof include polyols such as glycerin, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol, trimethylolpropane, or pentaerythritol; lactams such as 2-pyrrolidone, N-methyl-2-pyrrolidone, β-caprolactam; and 1,3-dimethylimidazolidine. These wetting agents have high boiling points so that they are not evaporated in the kneading step, and the stable condition of the kneading step is maintained. Besides, since a wetting agent is essentially a part of the ink-jet recording ink, there is no need for removing after the kneading step, and it is possible to directly transfer from the dispersing step to the following step.

In order to produce an ink-jet recording aqueous ink by using the aqueous pigment dispersion liquid produced by using the aforementioned raw materials, the aforementioned aqueous pigment dispersion liquid is appropriately diluted with an aqueous medium such as water or a wetting agent.

In the ink-jet recording ink prepared from an aqueous pigment dispersion liquid for an ink-jet ink, the amount of C. I. pigment violet 23 is preferably 2 to 10 mass % so as to obtain sufficient image density and to secure the dispersion stability of the dispersion particles in the ink.

It is preferable that a wetting agent be blended in the aqueous medium which dilutes the aqueous pigment dispersion liquid since it contributes to dry-prevention, viscosity adjustment, and density adjustment. Examples of the aqueous medium are the same as the aforementioned ones used to disperse the colored, kneaded material for the aqueous pigment dispersion liquid. The content of a wetting agent for the purpose of dry-prevention is preferably 3 to 50 mass % in an ink.

Also, in the case where an ink-jet recording ink is prepared, a penetrant can be added for the purpose of the improvement of permeability to a recording medium and the adjustment of the dot diameter on a recording medium. Examples of a penetrant include a lower alcohol such as ethanol or isopropanol; an ethylene oxide-adduct of alkylalcohol such as ethylene glycol hexyl ether or diethylene glycol butyl ether; and a propylene oxide-adduct of alkylalcohol such as propylene glycol propyl ether. The content of a penetrant is preferably 0.01 to 10 mass % in an ink.

In the case where an ink-jet recording ink is prepared, a surfactant can be added in order to adjust the properties of ink such as surface tension. These surfactants are used alone or in combination of 2 or more. Also, in consideration of the solubility stability of a surfactant, HLB (Hydrophile-Lipophile Balance) thereof is preferably within a range of 7 to 20.

In the case where a surfactant is added, the addition amount is preferably within a range of 0.001 to 1 mass %, more preferably a range of 0.001 to 0.5 mass %, and particularly preferably a range of 0.01 to 0.2 mass %. When the addition amount of a surfactant is less than 0.001 mass %, the effect of the addition of a surfactant cannot be obtained. When the addition amount exceeds 1 mass %, the problem of blurring of the image tends to occur.

In the case where an ink-jet recording ink is prepared by using an aqueous pigment dispersion liquid for an ink-jet, an antiseptic agent, a viscosity modifier, a pH moderator, a chelating agent, a plasticizer, an antioxidant, and an ultraviolet absorber can be added according to need.

In the case where an ink-jet recording ink is prepared, coarse particles become the cause of nozzle clogging and the deterioration of other image properties, and therefore, after the preparation of an ink, coarse particles may be removed by centrifugal separation or a filtration process.

This ink-jet recording ink can be preferably used as an ink for ink-jet recording. The ink-jet system to be used is not particularly limited, and examples thereof include known ones including continuous injection-type systems such as an electric charge-controlling type system or a spray type system; and on-demand systems such as a piezo system, a thermal system, or an electrostatic attraction system. Among these, it is preferable that the ink is used in printers using a thermal ink-jet recording system.

EXAMPLE

Hereinafter, the present invention is further described in detail with reference to Examples.

In the following Synthesis Examples, Examples, and Comparative Examples, "part" and "%" represent "part by mass" and "mass %".

Synthesis Example 1

In the reactor including a stirrer, a dropping device, and a reflux device, 100 parts of methyl ethyl ketone was added, and nitrogen substitution was performed in the reactor while stirring. While keeping nitrogen atmosphere in the reactor, heating was performed to reflux methyl ethyl ketone, and then, the mixed solution of 77 parts of styrene, 10 parts of acrylic acid, 13 parts of methacrylic acid, and 8 parts of the polymerization catalyst (produced by Wako Pure Chemical Industries, Ltd./ "V-59") was added dropwise from the dropping device for 2 hours. From the middle of dropping, temperature of the reaction system was kept at 75° C.

After the end of dropping, the reaction was kept at the same temperature for 25 hours. In the middle of the reaction, while checking the consumption of the raw materials, the polymerization catalyst was added appropriately. After the end of the reaction, cooling was performed, and methyl ethyl ketone was added so as to obtain the solution of the styrene-acrylic acid-based copolymer (A-1) with a solid content of 50%, which contains anionic groups. The styrene-acrylic acid-based copolymer (A-1) has an acid value of 152 mgKOH/g and a weight average molecular weight of 11500.

In the present invention, a weight average molecular weight is a value which is measured by a GPC (Gel Permeation Chromatography) method and is converted to the molecular weight of polystyrene used as a standard material. Herein, the measurement was performed by using the following apparatuses and conditions.

Solution-sending pump: LC-9A
System controller: SLC-6B
Auto injector: S1L-6B
Detector: RID-6A
These are manufactured by Shimazu Corporation.
Data processing software: Sic480II data station (manufactured by System Instruments Corporation).
Column: GL-R400 (a guard column)+GL-R440+GL-R450+GL-R400M (made by Hitachi Chemical Co., Ltd.)
Elution solvent: THF
Elution flow rate: 2 ml/min
Column temperature: 35° C.

Synthesis Example 2

In Synthesis Example 1, 77 parts of styrene, 10 parts of acrylic acid, and 13 parts of methacrylic acid were replaced with 73 parts of styrene, 10 parts of acrylic acid, and 15 parts of methacrylic acid, and then, the polymerization was performed so as to obtain the styrene-acrylic acid-based copolymer (A-2) with a weight average molecular weight of 8800 and an acid value of 184 mgKOH/g.

Example 1

Preparation of Aqueous Pigment Dispersion Liquid

| | |
|---|---|
| Styrene-acrylic acid-based copolymer (A-1) | 150 parts |
| C.I. pigment violet 23 (a) (Hostaperm Violet RL Spec. produced by Clariant(Japan)K.K.) | 500 parts |
| 8 N Potassium hydroxide aqueous solution | 67.1 parts |
| Diethylene glycol | 260 parts |

The mixture of the aforementioned composition was prepared and added in the planetary mixer (manufactured by Inoue Manufacturing Co., Ltd./PLM-V-50V), and kneaded at a rotation frequency of 35 rpm and a revolution frequency of 24 rpm, for 360 min. After a lapse of 20 min, the mixture was collected together in the shape of a rod, and kneading was kept as is. During kneading, the consumed current value was 6 to 12 ampere, and the increase and decrease were repeated depending on the rotational period. This was due to the following reason. The mixture was a semisolid with an extremely high viscosity so that it was not distributed uniformly. Therefore, whenever the stirring blade sheared the mixture periodically, a strong force was applied thereto.

After a lapse of 360 min, as a let-down operation, water was added at an average rate of about 0.015/min, which is an increasing rate of a water/pigment mass ratio, so as to obtain the uniform mixture with a pigment content of 29.3 mass %.

The obtained mixture was transferred into a stainless drum, and the following are added therein.

| | |
|---|---|
| Ion-exchanged water | 1162 parts |
| Diethylene glycol | 220 parts |

Then, the mixture, which was uniformly mixed with a stirring motor, passed through the beads mill (Nano Mill NM-G-2L produced by Asada Iron Works. Co. Ltd.), and was dispersed at a temperature of 20° C. for a detention period of 2.5 min, thereby obtaining the dispersed material.

Subsequently, this dispersed material passed through the continuous centrifugal separation apparatus (H-600S produced by Kokusan Enshinki Co. Ltd., 2 L volume), and the centrifugal separation was continuously performed at a temperature of 25° C. with a centrifugal force of 18900 G for a detention period of 10 min, thereby obtaining the aqueous pigment dispersion liquid with a pigment content of 14.8%.

Example 2

The same operations as in Example 1 were used except for adding the operation in Example 1, in which 15 parts of ion-exchanged water were added at a lapse of 0 to 180 min after the start of kneading, and 35 parts of water were further added at a lapse of 180 to 360 min (before let-down) at a rate of no more than 0.002/min which is an increasing rate of a water/pigment mass ratio. Then, the aqueous pigment dispersion liquid with a pigment content of 14.5% was obtained.

Example 3

The same operations as in Example 1 were used except for using the styrene-acrylic acid-based copolymer (A-2) instead of the styrene-acrylic acid-based copolymer (A-1). Then, the aqueous pigment dispersion liquid with a pigment content of 14.7% was obtained.

Example 4

The same operations as in Example 1 were used except for adding the operation in Example 1, in which 205.7 parts of ion-exchanged water were added during 180 to 360 min from the start of the kneading (before let-down) at a rate of no more than 0.002/min which is an increasing rate of a water/pigment mass ratio. Then, the aqueous pigment dispersion liquid with a pigment content of 14.4% was obtained.

Example 5

The same operations as in Example 1 were used except for changing a detention time of 2.5 min into 0.8 min. Then, the aqueous pigment dispersion liquid with a pigment content of 14.5% was obtained.

Example 6

The same operations as in Example 1 were used except for changing a detention time of 2.5 min into 4.0 min. Then, the aqueous pigment dispersion liquid with a pigment content of 14.5% was obtained.

Comparative Example 1

The same operations as in Example 1 were used except for using 22.8 parts of potassium hydroxide (granulated, manufactured by Kanto Chemical Co., Inc.) instead of 67.1 parts of an 8 N potassium hydroxide aqueous solution (manufactured by Kanto Chemical Co., Inc.). Then, the aqueous pigment dispersion liquid with a pigment content of 14.8% was obtained.

Comparative Example 2

The same operations as in Example 1 were used except for adding the operation in Example 1, in which 205.7 parts of ion-exchanged water were added during 0 to 120 min after the start of the kneading at a rate of less than 0.002/min which is an increasing rate of a water/pigment mass ratio. Then, the aqueous pigment dispersion liquid with a pigment content of 14.4% was obtained.

Comparative Example 3

The same operations as in Example 1 were used except for changing a detention time in the beads mill of 2.5 min into 0.2 min. Then, the aqueous pigment dispersion liquid with a pigment content of 14.6% was obtained.

Comparative Example 4

The same operations as in Example 1 were used except for changing a detention time in the beads mill of 2.5 min into 6.0 min. Then, the aqueous pigment dispersion liquid with a pigment content of 14.6% was obtained.

Regarding the aforementioned Examples and Comparative Examples, the properties were evaluated by using the following evaluation methods.

A. Measurement for evaluation of Dispersing Step Conditions
<Evaluation of Viscosity>

The solid colored, kneaded material, which was prepared in the kneading step, was diluted, and the change in viscosity in the dispersing step was measured from the viscosities at the start and the end of the dispersing step. In the measurement, TV-22 was used, and the viscosity of a sample of 3 mL was measured under the conditions of a rotation frequency of 100 rpm and a temperature of 25° C.

B. Characterization of Aqueous Pigment Dispersion Liquid
<Quantitative Determination of Coarse Particles>

The aqueous pigment dispersion liquid, which was obtained in the Examples and Comparative Examples, was diluted by 100 times, and passed through a particle size analyzer AccuSizer 780 APS manufactured by Particle Sizing Systems Corporation. Then, the number of coarse particles with a particle diameter of 1 µm or more was calculated, and converted to the number of particles in the liquid of 1 mL before dilution. The measurements were performed after the dispersing step and the centrifugal separation step.

<Evaluation of Dispersion Property>

The particle diameters and the viscosities of the pigments in the aqueous pigment dispersion liquids obtained in Examples and Comparative Examples were measured. Regarding a particle diameter, the volume average particle diameters were measured by using "Microtrac UPA 150" (produced by Leeds & Northrup Co.) as the particle diameters of the aqueous dispersion liquids. The viscosities were measured at 25° C. by using E type viscometer (TVE-20L produced by TOKIMEC INC.).

| | |
|---|---|
| Aqueous pigment dispersion liquid | 5.52 parts |
| 2-Pyrrolidinone | 1.60 parts |
| Triethylene glycol monobutyl ether | 1.60 parts |
| Surfynol 440 (manufactured by Nissin Chemical Industry Co., Ltd.) | 0.10 parts |
| Glycerine | 0.60 parts |
| Ion-exchanged water | 10.58 parts |

The prepared ink was loaded into the position of the black cartridge in the ink-jet printer EM-930C (manufactured by Seiko Epson Corporation), and the recording with a image density of 95% was performed by using the Premium Glossy Photo Paper (produced by Seiko Epson Corporation) as a recording medium. Then, the luster of the obtained image was measured by using "micro-TR1-gloss" (produced by BYK-Gardner) as a Gloss value at an angle of 20°.

Consequently, it was confirmed that the inks prepared from the aqueous pigment dispersion liquids of all Examples and Comparative Examples could form the favorable image for the luster measurement, and showed the favorable discharging property.

<Evaluation of Stability>

The inks prepared in the evaluation of luster were left at rest for 12 weeks under the temperature condition of 90° C., the change in particle diameter before and after leaving at rest was investigated, and was used as a barometer of stability.

In the present invention, among pigments which are colorants excellent in water resistance and light fastness, C. I. pigment violet 23 was used, which is particularly excellent in light fastness, and the water resistance and the light fastness of the printed images were favorable in all Examples and Comparative Examples.

TABLE 1

| | | Kneading step conditions | | Dispersing step conditions | | | Properties of aqueous pigment dispersion liquid | | | | Properties of ink-jet recording ink | |
|---|---|---|---|---|---|---|---|---|---|---|---|---|
| | | Water/V23 (mass ratio) | | | | | Number of coarse particles (×ten million pieces/mL) | | Volume | | Rate of | |
| | Used co-poly-mer | Before first half of kneading step | After first half of kneading step | Dis-persion period (min) | Viscosity after dispersion (mPa·s) | Change in viscosity in step (%) | After dispersing step | After centrifugal separation step | average particle diameter (nm) | Viscosity (mPa·s) | change in particle diameter (%) | Luster |
| Example 1 | A-1 | 0.09 | 0.09 | 2.5 | 5.60 | 5.7 | 36 | 0.3 | 106 | 4.61 | 1 | 101 |
| Example 2 | A-1 | 0.12 | 0.19 | 2.5 | 5.49 | 5.8 | 59 | 0.6 | 107 | 4.51 | 3 | 100 |
| Example 3 | A-2 | 0.09 | 0.09 | 2.5 | 5.38 | 5.5 | 45 | 0.7 | 109 | 4.43 | 6 | 97 |
| Example 4 | A-1 | 0.09 | 0.50 | 2.5 | 5.82 | 6.1 | 75 | 0.9 | 111 | 4.61 | 56 | 95 |
| Example 5 | A-1 | 0.09 | 0.09 | 0.8 | 5.40 | 1.9 | 32 | 0.3 | 106 | 4.44 | 3 | 100 |
| Example 6 | A-1 | 0.09 | 0.09 | 4.0 | 5.82 | 9.8 | 33 | 0.3 | 107 | 5.01 | 24 | 95 |
| Comparative Example 1 | A-1 | 0.00 | 0.00 | 2.5 | 5.30 | 5.3 | 1598 | 24 | 260 | 4.62 | 659 | 26 |
| Comparative Example 2 | A-1 | 0.50 | 0.50 | 2.5 | 5.41 | 5.4 | 129 | 12 | 119 | 4.69 | 255 | 80 |
| Comparative Example 3 | A-1 | 0.09 | 0.09 | 0.2 | 5.34 | 0.8 | 342 | 33 | 119 | 4.41 | 74 | 61 |
| Comparative Example 4 | A-1 | 0.09 | 0.09 | 6.0 | 6.30 | 18.9 | 23 | 0.6 | 105 | 5.42 | 243 | 84 |

(In Table 1, V23 represents C.I. pigment violet 23.)

C. Evaluation of Properties of Ink-Jet Recording Ink
Evaluation of Discharging Property/Luster The ink-jet recording inks were prepared by using the aqueous pigment dispersion liquids obtained in Examples and Comparative Examples, according to the following composition.

As shown in Table 1, the aqueous pigment dispersion liquids produced by the production methods of Examples 1 to 6 rarely have coarse particles with a particle diameter of 1 µm or more, and have fine particles with a volume average particle diameter of about 100 nm, in which the aforementioned production methods includes the dispersion step of dispersing the mixture including C. I. pigment violet 23 (a), the styrene-acrylic acid-based copolymer (b) with an acid value of 50 to 300 mgKOH/g, the alkali metal hydroxide (c), water (d), and the wetting agent (e), thereby producing an aqueous pigment dispersion liquid; and the kneading step in which the kneading was performed under the conditions of the mass ratio of (b)/(a) ranging from 0.15 to 0.45 and the mass ratio of (d)/(a) ranging from 0.04 to 0.42 in the first half of the kneading step. Also, the ink-jet recording inks containing the aqueous pigment dispersion liquid as a main component have the favorable stability during the high-temperature preservation and the small rate of change in particle diameter in comparison with Comparative Examples.

In Example 4, since water was added in the second half of the kneading step, the shear force during the kneading was slightly lowered, and therefore, the rate of change in particle diameter during high-temperature preservation was high.

In Example 6, since the dispersion period was elongated to 4 min, the viscosity of the aqueous pigment dispersion liquid was increased due to the elimination of the resins as the dispersion period was elongated although the number of coarse particles after the dispersing step was maintained to the small number. It was found that the rate of change in particle diameter during high-temperature preservation was higher than those of the inks produced in Examples 1 to 3, and the thermal stability during high-temperature preservation was slightly deteriorated.

In Example 5 in which the dispersion period was shortened to 0.8 min, the number of coarse particles after the dispersing step was not increased so much and maintained to the same level as the others. In Example 5, the change in viscosity in the step was maintained to the lower level, thereby producing the aqueous pigment dispersion liquid with the equivalently small particle diameter and small viscosity to those in Examples 1 to 3. Accordingly, the image with a favorable luster could be formed. In Example 5, the kneading step was performed under the equivalently favorable kneading conditions to those in Example 1. Therefore, even if the dispersion period was shortened to one third of those in Examples 1 to 3, the number of coarse particles was not increased, and the equivalent dispersion stability during high temperature preservation to other Examples was obtained. Rather, as the dispersion period was short, the elimination of the resins rarely occurred, and the change in viscosity during the dispersing step was extremely low.

In contrast, in Comparative Example 1 in which the mass ratio of (d)/(a) was lower than the aforementioned range, the crush of the pigments in the kneading step was insufficient, the content of coarse particles was high, and the luster of the image was extremely low when the ink-jet recording ink was formed. In addition, since the covering of the pigments with the copolymers were insufficient, the high-temperature preservation stability was poor. In Comparative Example 2 in which the mass ratio of (d)/(a) exceeded the aforementioned range in the first half of the entire kneading period, the crush of the pigments did not proceed due to the insufficient shear force in the kneading step, and the coarse particles could not be microparticulated even after the dispersing step. In addition, the large number of the coarse particles remained even after the centrifugal separation step. In addition, since the shearing force was insufficient in the kneading step, the covering of the pigments was insufficient, and the high-temperature stability was poor although not to the extent of Comparative Example 1.

In Comparative Example 4 in which the dispersion period was elongated, the initial properties of the aqueous pigment dispersion liquid were not deteriorated. However, it was found that the rate of change in particle diameter was high when the ink-jet recording ink produced using the aqueous dispersion liquid was preserved at the high temperature, and the stability was deteriorated. In Comparative Example 3 in which the dispersion period was extremely shortened, the removal of coarse particles was hard to be performed, and the luster was lowered when the image was formed.

In Example 4 in which in which the mass ratio of (d)/(a) exceeded the aforementioned range in the second half of the entire kneading period, each of the properties were deteriorated, but much more favorable properties than in Comparative Examples 1 and 2 were maintained. On the basis of these results, it was found that the adjustment of (d)/(a) in the first half of the kneading period was particularly important.

INDUSTRIAL APPLICABILITY

According to the present invention, it is possible to produce an aqueous pigment dispersion liquid having a purple color, which is excellent in water resistance, light fastness, and color-developing properties, and which simultaneously exhibits long-term stability at high temperatures and a high luster. Also, by using this aqueous pigment dispersion liquid, it is possible to produce an ink-jet recording ink, particularly an ink-jet recording ink which is suitable for an ink-jet recording printer using a thermal jet print system. Therefore, the present invention is industrially useful.

The invention claimed is:

1. A production method of an aqueous pigment dispersion liquid, comprising:
   a kneading step of kneading a mixture including C. I. pigment violet 23 (a), a styrene-acrylic acid-based copolymer (b) with an acid value of 50 to 300 mgKOH/g, an alkali metal hydroxide (c), water (d), and a wetting agent (e), thereby producing a colored, kneaded material with the solid content within a range of 50 to 80 mass %; and
   a dispersion step of dispersing the colored, kneaded material in an aqueous medium by using a beads mill, wherein
   the mass ratio of (b)/(a) is within a range of 0.15 to 0.45 in the kneading step,
   the mass ratio of (d)/(a) is within a range of 0.04 to 0.42 during the entire kneading step,
   the change in viscosity of materials to be dispersed is 10% or lower in the dispersion step,
   the viscosity of the dispersed materials after the dispersing step is 5.0 mPa·s or lower when a content of C. I. pigment violet 23 (a) is 10 mass %,
   a retaining period of the colored, kneaded material in the beads mill is within a range of 0.8-5 min, and
   the number of coarse particles with a particle diameter of 1 µm or more is 150 million to 1 billion pieces/mL after the dispersion step.

2. A production method of an aqueous pigment dispersion liquid according to claim 1, wherein the mass ratio of (e)/(a) is within a range of 0.15 to 0.60.

3. A production method of an aqueous pigment dispersion liquid according to claim 1, wherein the styrene-acrylic acid-based copolymer (b) has a styrene-based monomer unit of 60 mass % or more in the total amount of all the monomer units and a weight average molecular weight of 6000 to 40000.

4. A production method of an aqueous pigment dispersion liquid according to claim 1, further comprising a centrifugal separation step in which a centrifugal separation is performed after the dispersion step.

5. A production method of an ink-jet recording ink comprising a step of using an aqueous medium to dilute the aqueous pigment dispersion liquid produced by the production method of the aqueous pigment dispersion liquid according to any one of claims 1 and 2-4.

6. A production method of an aqueous pigment dispersion liquid according to claim 1, wherein the aqueous pigment dispersion liquid has a purple color.

7. A production method of an aqueous pigment dispersion liquid according to claim 1, wherein the retaining period of the colored, kneaded material in the beads mill is within a range of 1-5 min.

* * * * *